US 6,658,602 B1

(12) United States Patent
Nakano

(10) Patent No.: US 6,658,602 B1
(45) Date of Patent: Dec. 2, 2003

(54) APPARATUS FOR DETECTING ABNORMAL EXECUTION OF PROGRAM

(75) Inventor: Takashige Nakano, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/522,617

(22) Filed: Mar. 10, 2000

(30) Foreign Application Priority Data

May 27, 1999 (JP) .......................................... 11-147710

(51) Int. Cl.[7] .............................................. H02H 7/00
(52) U.S. Cl. .............................. 714/38; 701/29; 701/31; 701/39; 701/49; 712/1
(58) Field of Search ......................... 714/38, 23; 712/1; 701/29, 31, 39, 49

(56) References Cited

U.S. PATENT DOCUMENTS

| | | | | |
|---|---|---|---|---|
| 5,257,358 A | * | 10/1993 | Cohen | .......................... 714/38 |
| 5,261,101 A | | 11/1993 | Fenwick | |
| 5,396,622 A | | 3/1995 | Lee et al. | |
| 5,604,877 A | | 2/1997 | Hoyt et al. | |
| 5,761,414 A | * | 6/1998 | Akaishi et al. | ................ 714/55 |
| 5,768,576 A | | 6/1998 | Hoyt et al. | |
| 5,867,107 A | * | 2/1999 | Gartner | ...................... 340/5.31 |
| 6,247,170 B1 | * | 6/2001 | Giroux | ........................ 717/131 |
| 6,401,025 B1 | * | 6/2002 | Knab et al. | .................. 701/102 |

OTHER PUBLICATIONS

Dictionary of Computers, Information Processing, & Telecommunications. Jerry M. Rosenberg. Second Edition. John Wiley & Sons, Inc.: 1987. page 359.*

* cited by examiner

Primary Examiner—Eddie Chan
Assistant Examiner—Aimee Li
(74) Attorney, Agent, or Firm—Oliff & Berridge PLC

(57) ABSTRACT

An apparatus for detecting abnormality in execution state of a control program. An electronic control unit to which the apparatus for detecting abnormality is applied is provided with a CPU, and a memory for storing a set value representing the number of sub-routines to be executed in each of a series of operations of the control program to be repeatedly executed. The CPU includes a control processor for drive-controlling a door lock motor by executing the control program; a counter for counting the number of the sub-routines that have been executed actually in each of the series of the operations; and a detector which compares the set value stored in the memory with a count value of the counter at the last of the series of the operations, detects that the execution state of the control program is abnormal when the two values are different from each other, and then performs reset of the control processor.

1 Claim, 4 Drawing Sheets

APPARATUS FOR DETECTING ABNORMAL EXECUTION OF PROGRAM

BACKGROUND OF THE INVENTION

1. Field of the Invention

The present invention relates to an apparatus for detecting abnormal execution of program, which detects abnormality in execution state of a program, and particularly to an apparatus for detecting abnormality in execution state of a control program in an electronic control unit for automobile.

2. Description of the Related Art

FIG. 3 is a block diagram showing the conventional structure of a door lock control system to which the present invention is applied. This control system is constructed so that a data processor (an electronic control unit 3 for automobile) controls an electric instrument (a door lock motor 5) to be controlled according to input from input means (a door lock switch 1), and a CPU 3a of the electronic control unit 3 controls the door lock motor 5 based on a predetermined control program.

In the control program, generally, a series of predetermined operations (predetermined process) is repeated to perform a control operation, as shown in FIG. 4. In the series of the operations, a plurality of sub-routines (sub-routines SR1 to SR4) are executed. Here, in the sub-routine SR1, reading of input from the door lock switch 1 is performed; in the sub-routine SR2, filtering is performed in which whether the input from the door lock switch 1 is not a noise but right is detected; in the sub-routine SR3, control determining operation for detetermining control of the door lock motor 5 in accordance with the input from the door lock switch 1 is performed; and in the sub-routine SR4, the detetermined control is output to the door lock motor 5 and an outputting operation for drive-controlling the door lock motor 5 is performed.

In this electronic control unit 3, as shown in FIG. 4, when the electronic control unit 3 is actuated and an initial operation is performed in step ST1, sequential steps ST2 to ST5 are repeated, whereby the sub-routines SR1 to SR4 are repeatedly executed. As a result, the control operation of the door lock motor 5 is performed based on the input from the door lock switch 1.

In the CPU 3a of the electronic control unit 3 for executing this control program, during execution of the control program, the memory of the program counter which indicates an executing position of the program (current position) is often disturbed by abnormality of a ROM or effects of noise, so that each of the sub-routines SR1 to SR4 is not normally completed and the executing position of the program can be moved to the unexpected wrong position. In this case, there is possibility that runaway of the CPU 3a (electronic control unit 3) is caused.

For example, as shown in FIG. 5, in a series of the operations, in case that step ST3 which must execute the sub-routine SR2 is not executed but step ST4 is executed after the sub-routine SR1 is completed in step ST2, as the sub-routine SR2 is not executed, difference occurs among the various data in the control program and a wrong operation or runaway can occur. Further, to the contrary, there is also a case that each of the sub-routines SR1 to SR4 is wrongly repeated and unnecessarily executed in a series of the operations, which may also cause the wrong operation or the like.

However, in the above-described conventional art, in case that any one of the sub-routines SR1 to SR4 to be executed is not executed or in case that any one of the sub-routines SR1 to SR4 is unnecessarily executed repeatedly in a series of the operations to be repeatedly executed of the control program, measures to meet the respective cases are not taken. Therefore, there is a problem that the wrong operation and runaway of the electronic control unit 3 caused by not suitably executing the predetermined sub-routines SR1 to SR4 to be executed thoroughly cannot be prevented.

SUMMARY OF THE INVENTION

In view of the above problem, an object of the present invention is to provide an apparatus for detecting abnormal execution of program, which can previously prevent the wrong operation and runaway of a data processor caused by not suitably executing sub-routines to be executed thoroughly in a predetermined process of the control program.

In order to achieve the above object, according to the invention, there is provided an apparatus for detecting abnormal execution of program, which detects abnormality in execution state of program in a data processor that performs a predetermined data processing by executing a program having a plurality of sub-routines to be executed in a predetermined process, comprising: memory means which is provided in the data processor and stores a set value representing the number of the sub-routines to be executed in the process of the program; counting means which is provided in the data processor and counts the number of the sub-routines that have been actually executed in the process of the program; and detecting means which is provided in the data processor, compares the set value stored in the memory means with a count value of the counting means in the last step of the process and then detects that the execution state of the program is abnormal in case that the two values are different from each other.

DETAILED DESCRIPTION OF THE PREFERRED EMBODIMENT

Figure 1:
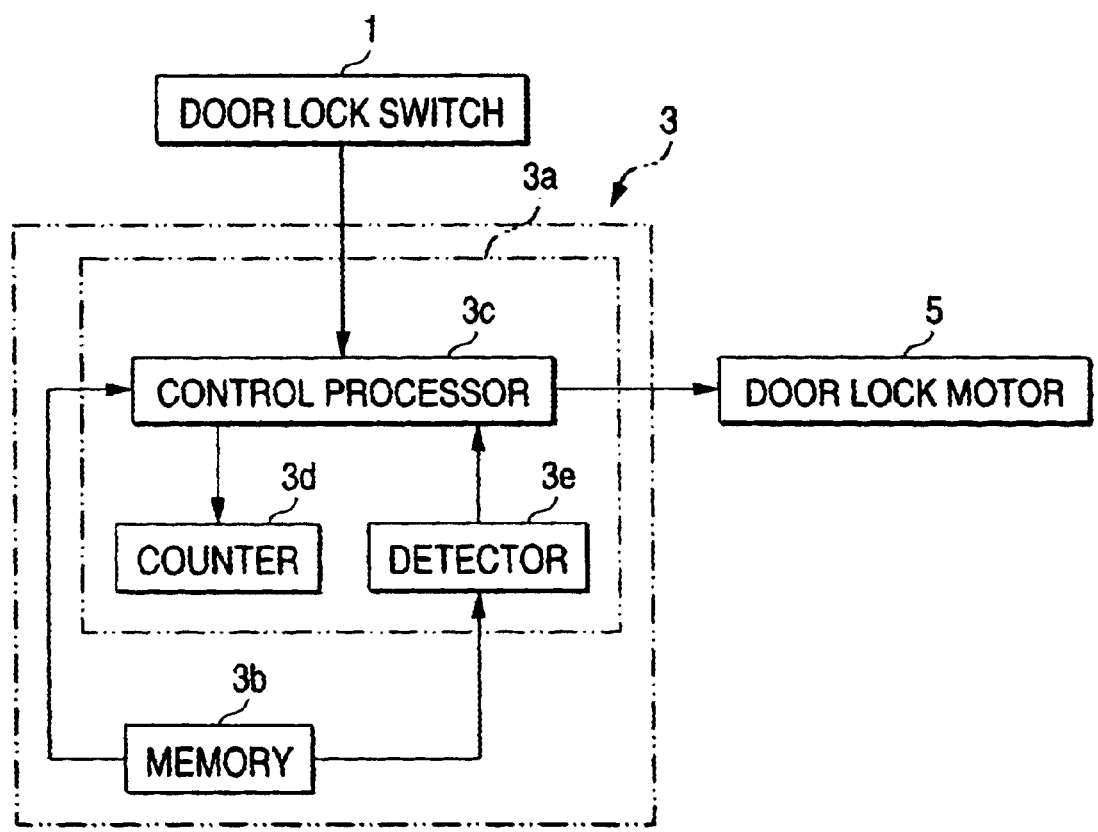
FIG. 1 is a block diagram of a door lock control system to which an apparatus for detecting abnormal execution of program according to an embodiment of the present invention is applied.
Figure 2:
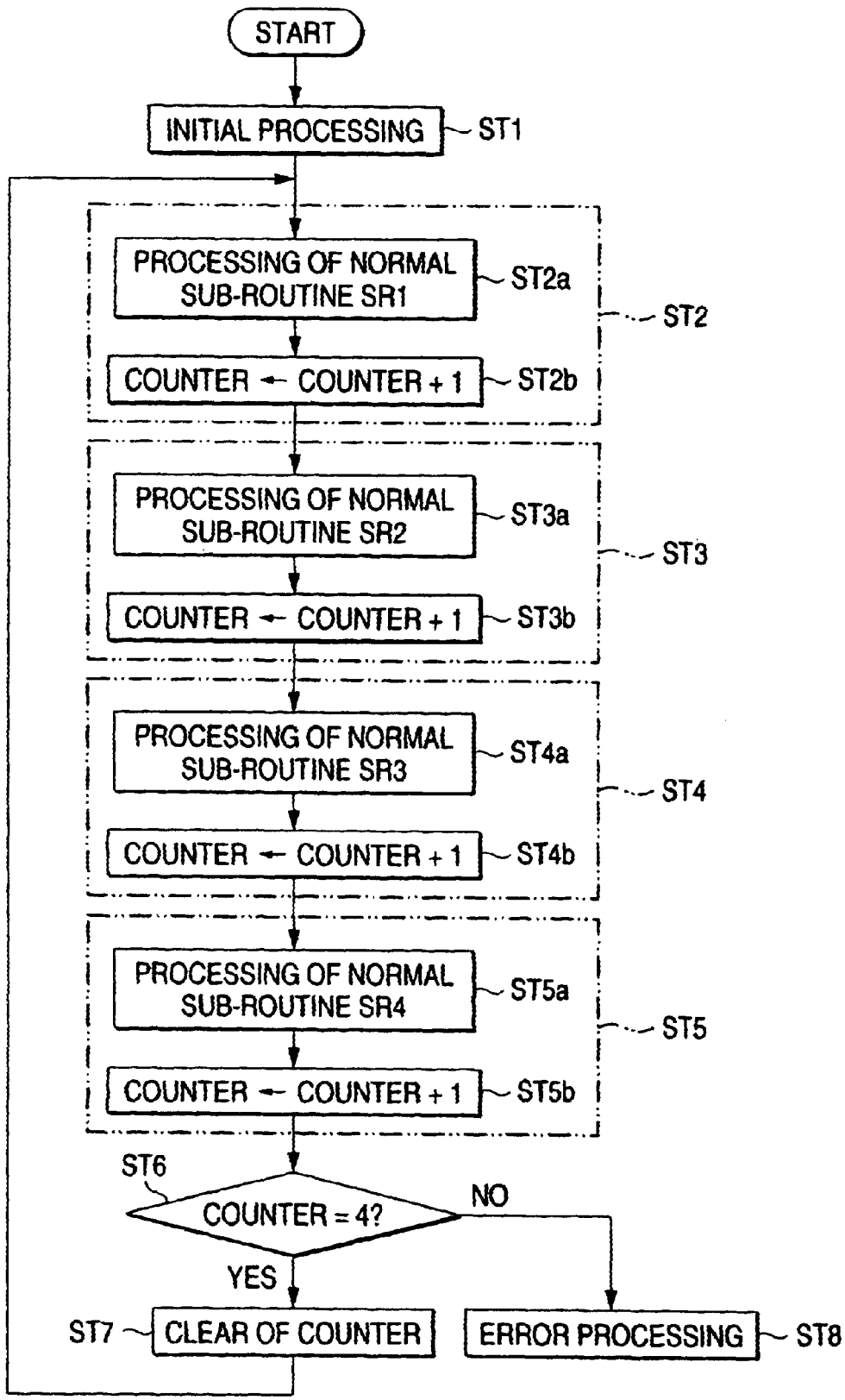
FIG. 2 is a flowchart showing a process for executing a control program of the door lock control system in FIG. 1.
Figure 3:
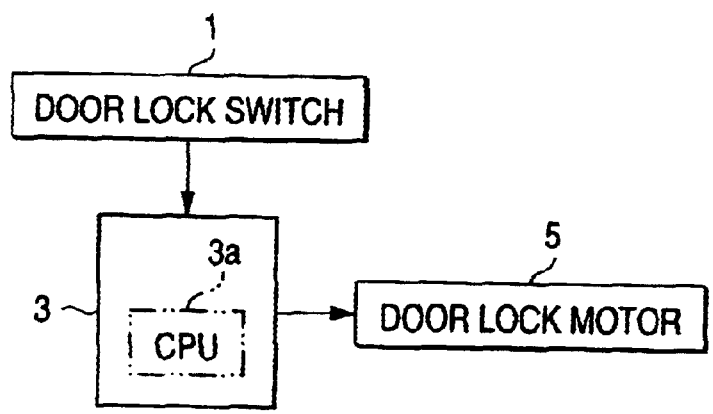
FIG. 3 is a block diagram showing the conventional structure of a door lock control system to which the invention is applied.
Figure 4:
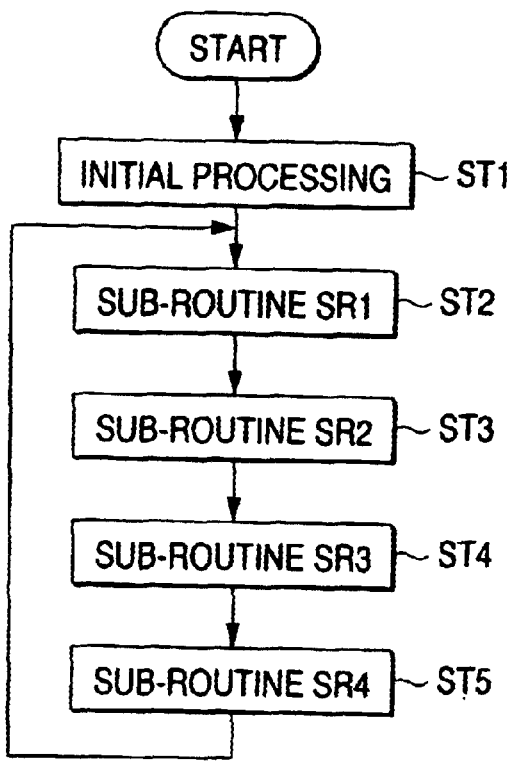
FIG. 4 is a flowchart showing a process for executing a control program of the door lock control system in FIG. 3.
Figure 5:
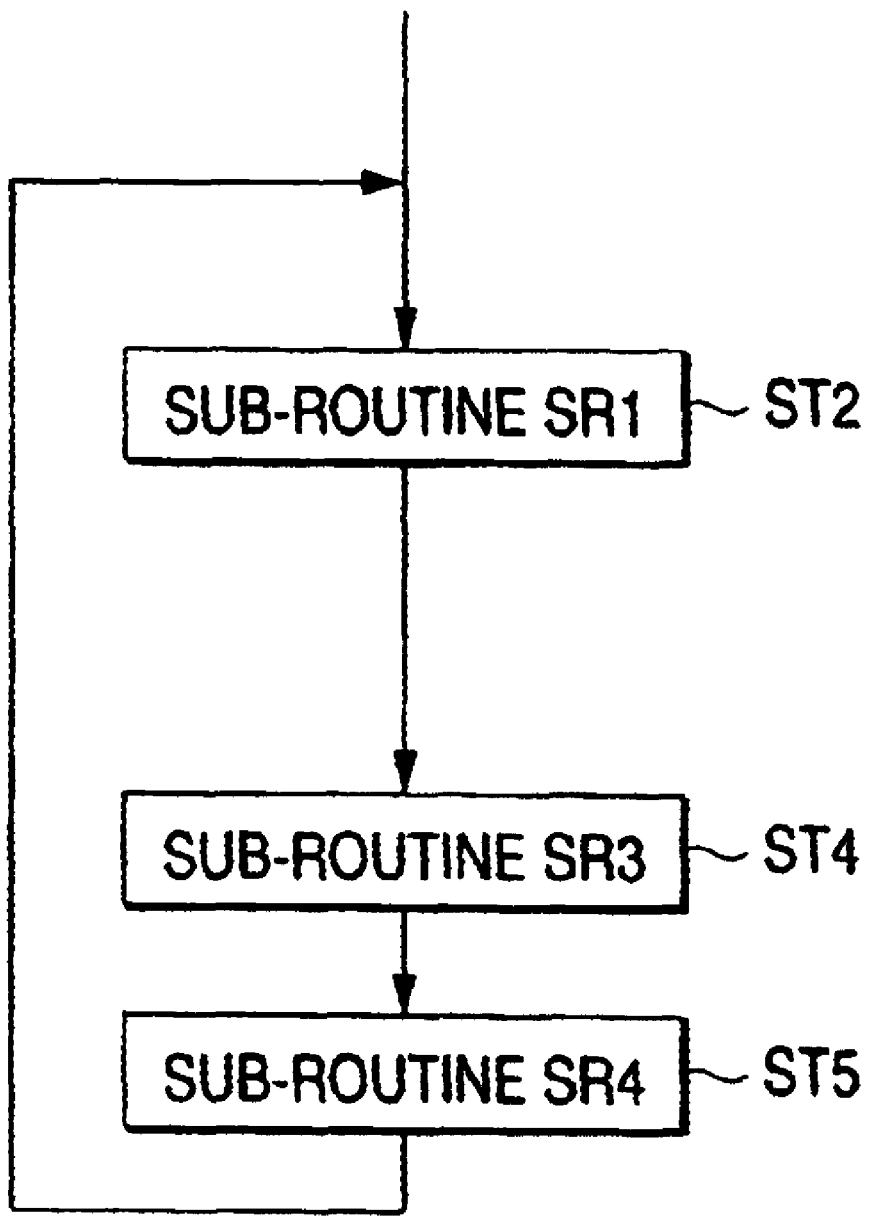
FIG. 5 is a chart showing a case where a sub-routine has not been erroneously executed in the process for executing the control program in FIG. 4.

FIG. 1 is a block diagram of a door lock control system to which an apparatus for detecting abnormal execution of program according to an embodiment of the invention is applied, and FIG. 2 is a flowchart showing a process for executing a control program of the door lock control system of FIG. 1. In FIGS. 1 and 2, parts corresponding to those in FIGS. 3 and 4 are marked with the same reference numerals and signs as those in FIGS. 3 and 4. Therefore, their descriptions are omitted.

As shown in FIG. 1, an electronic control unit 3 is provided with a CPU 3a for drive-controlling a door lock motor 5 according to input from a door lock switch 1 by executing a predetermined control program, and a memory (memory means) 3b for storing the control program, control data, and the like therein. The control program has the aforesaid plural sub-routines SR1 to SR4 similarly to the control program shown in FIG. 4, and these plural sub-routines SR1 to SR4 are repeatedly executed as shown in FIG. 2 to perform a control operation. A set value representing the number of the sub-routines SR1 to SR4 to be executed in each of a series of operations of the control program to be repeatedly executed is stored in the memory 3b.

The CPU 3a comprises a control processor (control processing means) 3c for drive-controlling the door lock motor 5 according to input from the door lock switch 1 by repeatedly executing the sub-routines SR1 to SR4 included in the control program; a counter (counting means) 3d for counting the number of the sub-routines SR1 to SR4 that have been executed actually by the control processor 3c in each of the series of the operations; and a detector (detecting means) 3e which compares the set valued stored in the memory 3b with a count value of the counter 3c at the last of the series of the operations, detects that the execution state of the control program is abnormal when the two values are different from each other, and then performs a predetermined error processing such as reset of the control processor 3c.

In this embodiment, a second constitution (memory means, counting means and detecting means) for detecting abnormality in the execution state of the control program is integrally incorporated into a first constitution (CPU 3a and memory 3b) for controlling the door lock motor 5 by executing the control program. However, the second constitution is not incorporated into the first constitution integrally but dedicated CPU and memory which serve as the second constitution may be provided.

Next, a process for executing the control program of the electronic control unit 3 will be described with reference to FIG. 2. After the electronic control unit 3 is actuated and a predetermined initial operation is performed in step ST1, a series of operations including steps ST2 to ST8 is repeated, whereby while the abnormality in the execution state of the control program is detected, the door lock motor 5 is controlled based on inputs from the door lock switch 1.

Each of steps ST2 to ST5 comprises two steps, one of which is steps ST2a to ST5a, and the other of which is sequential steps ST2b to ST5b. In first steps ST2a to ST5a, the aforesaid normal operation of each of the corresponding sub-routines SR1 to SR4 is executed by the control processor 3c, and after execution of the normal operation is completed, the procedure proceeds to steps ST2b to ST5b.

In the sequential steps ST2b to ST5b, after execution of each sub-routine SR1 to SR4 is completed, a counting operation is performed by the counter 3d. Namely, every time each of the sub-routines SR1 to SR4 to be executed in the series of operations is suitably executed, one is added to the count value of the counter 3d in order. Hereby, the number of the sub-routines that have been executed is counted. When the execution of all the sub-routines SR1 to SR4 to be executed is completed, the procedure proceeds to step ST6. In case that each of the sub-routines SR1 to SR4 to be executed is suitably executed thoroughly, the count value of the counter 3c indicates the suitable predetermined value (in this case, the count value is four).

In step ST6, the detector 3e compares the set value representing the number of the sub-routines SR1 to SR4 to be executed in the series of operations with the count value of the counter 3d and then judges whether the two values agree with each other. In case that each of the sub-routines SR1 to SR4 to be executed is suitably executed thoroughly and the two values agree with each other, the procedure proceeds to step ST7 in which the count value of the counter 3d is cleared, and then the procedure returns to step ST2 in which the series of the operations are repeated. On the other, in case that each of the sub-routines SR1 to SR4 to be executed is not executed, or is unnecessarily repeated and executed, and the both values do not agree with each other, the procedure proceeds to step ST8 in which the detector 3e performs an error processing operation.

In the error processing operation of step ST8, for example, the operation of the control processor 3c is reset once (initialized) in order to prevent the wrong operation, and thereafter the procedure returns to the start to repeat the series of the operations from step ST1.

As described above, according to this embodiment, in case that the sub-routines SR1 to SR4 to be executed are not executed in the series of the repeatedly executed operations of the control program, or they are unnecessarily repeated and executed, the difference occurs between the set value stored in the memory 3b and the count value of the counter 3d. The presence of this difference is detected by the detector 3e, whereby it can be reliably detected that the sub-routines SR1 to SR4 to be executed have been not suitably executed thoroughly, so that the wrong operation and runaway of the electronic control unit 3 caused by the bad execution of these sub-routines SR1 to SR4 can be previously prevented.

In this embodiment, a case where the invention is applied to the door lock control system for controlling the door lock motor 5 is described, however, the invention is not limited to this.

According to the invention, in case that the sub-routines to be executed in the predetermined process of the program are not executed, or in case that they have been unnecessarily repeated and executed, as the difference occurs between the set value stored in the memory means and the count value of the counting means, the presence of this difference is detected by the detecting means, whereby it can be reliably detected that the sub-routines to be executed have not been suitably executed thoroughly. Therefore, the wrong operation and runaway of the data processor caused by the bad execution of these sub-routines can be previously prevented.

What is claimed is:

1. An apparatus for detecting abnormal execution of a control program of an electronic control unit for an automobile lock system comprising at least a door lock motor and a door lock switch, which detects an abnormal execution state of the program by a data processor that performs a predetermined data process by executing a program having a plurality of sub-routines to be executed in a predetermined process, comprising:

memory means which is provided in said data processor and stores a set value representing the number of the sub-routines to be executed in the process of the program;

counting means which is provided in said data processor and which counts the number of sub-routines that have actually been executed in the process of the program;

detecting means which is provided in said data processor, which compares the set value stored in said memory means with a count value of said counting means in the last step of the process and then detects that the execution state of the program is abnormal when the two values are different from each other, wherein when the execution state is abnormal, error processing occurs so that the data processor is reset; and control processing means which is provided in said data processor and drive-controls for an electric instrument to be controlled according to input from an input means by repeatedly executing the plurality of sub-routines included in the program, wherein said input means is the door lock switch and said electric instrument to be controlled is the door lock motor.

* * * * *